United States Patent [19]

Cooper et al.

[11] Patent Number: 5,722,737
[45] Date of Patent: Mar. 3, 1998

[54] BRAKE RELEASE FOR RAILROAD CARS

[76] Inventors: David Cooper, 1113 Tamarron Pkwy., Smyrna, Ga. 30080; Charles Cooper, deceased, 504 D Pineview, late of Waycross, Ga. 31501, by Rosalind T. Cooper, executor

[21] Appl. No.: 593,882

[22] Filed: Jan. 30, 1996

[51] Int. Cl.⁶ .................................................. B60T 15/02
[52] U.S. Cl. .................................. 303/68; 308/70; 308/86
[58] Field of Search ........................... 303/70, 68, 36, 303/51, 86, 69, 72, 75, 76, 77, 78, 79, 80, 81, 50–56, 2, 64, 66

[56] References Cited

U.S. PATENT DOCUMENTS

| | | | |
|---|---|---|---|
| 2,779,635 | 1/1957 | Wideman | 303/68 |
| 2,867,479 | 1/1959 | Kowalski | 303/70 |
| 3,123,409 | 3/1964 | Parsons | 303/70 |
| 3,378,312 | 4/1968 | Greene, Jr. | 303/70 |
| 3,752,539 | 8/1973 | Sill | 303/68 |
| 3,823,986 | 7/1974 | Pollinger et al. | 303/21 F |
| 4,346,790 | 8/1982 | Morrison et al. | 188/33 |
| 4,452,345 | 6/1984 | Mathieu | 188/33 |
| 4,553,723 | 11/1985 | Nichols et al. | 246/167 R |
| 4,971,179 | 11/1990 | Han | 188/33 |

*Primary Examiner*—Douglas C. Butler

[57] ABSTRACT

A brake release for railroad cars allows all the brakes of a train to be released automatically instead of by the conventional, car by car method. The crewmember releasing the brakes does so by merely adjusting the air pressure in the train's air brake line to a predetermined level. The brake release system's valves open at this pressure allowing the system to be pressurized. This pressure provides the force needed to release the brakes when the pressure in the train's air brake line is released. The system then resets itself and is ready for its next use. This system can be installed on a rail car without interfering with the conventional method of releasing the brakes.

7 Claims, 3 Drawing Sheets

BRAKE RELEASE FOR RAILROAD CARS

BACKGROUND OF THE INVENTION

1. Field of the Invention

The invention described herein is an improvement to railcars and will allow the brakes of all the cars of a train to be released quickly and in unison.

2. Background—Description of Prior Art

For many years trains have been provided with air brake systems in which the pressure in an air brake line running the entire length of the train is controlled by the brakeman or engineer in the cab. The operating principal is fail-safe in that the brakes are applied automatically when air pressure in the air brake line is released deliberately by the brakeman or engineer or accidentally by a break or other leak in the air line. While the train is running, the brakes may be applied by reducing the pressure in the air brake line. The degree to which the brakes are applied depends upon the degree to which the pressure in the air brake line is reduced. The system is designed for a selected nominal operating pressure in the air brake line in order to hold the brakes off. For example, this nominal operating pressure may be 80 pounds per square inch (psi). On a long train however, the actual air line pressure at the back end of the train may be lower than at the front end by 10 psi or more. When the train pulls into a railroad yard, the engine or engines are uncoupled and the air pressure is released. Consequently, the brakes on all the cars are applied automatically. The brakes are then released by manual manipulation of an operating rod that is accessible at the bottom of one end of each car. This rod opens a pressure responsive valve connected between the air brake line and the brake. This brake release procedure is labor intensive and leads to down time for each car. Accordingly, there is a need for an improved brake release procedure to facilitate efficient use of railcars.

SUMMARY OF THE INVENTION

This need is met by the present invention which is directed to a novel and improved brake release system for railcars which may be operated by a crewmember. The brakes may be released automatically on as many of the cars in the train as are equipped with this system instead of manually one car at a time.

The principal object of this invention is to provide a novel and improved brake release system for railroad cars. This release will operate automatically in response to a simple sequence of steps performed by a crewmenber at the time he/she uncouples the engine or engines from the train.

The system may be operated from the conventional air brake line or an independent air line on the train and will not interfere with the usual operation of the brake system when the train is running.

The conventional manual brake release apparatus on the cars can be maintained without interfering with the brake release system's operation.

Furthermore, the new brake release system can be operated from the usual air brake line and can act on the usual pressure responsive brake release valve through the same operating rod that has been used to manually release the brakes.

Further objects and advantages of this invention will be apparent from the following detailed description and drawings of a presently preferred embodiment.

REFERENCE NUMERALS IN DRAWINGS

10 Air Brake Line
11 Reservoir
12 Pressure Responsive Valve
13 Cylinder and Piston Unit
14 Brake
15 Conduit
16 Operating Rod
18 Plate
19 Slot
20 Air Cylinder
21 Piston
22 Piston Rod
23 Lever
24 Follower
25 Spring
26 Bleed Passage
27 Cylinder Balancing Chamber
28 Valve
29 Cylinder Compression Chamber
30 Check Valve
40 Check Valve
45 Sequencing Reservoir
50 Check Valve
55 Quick Release Coupling
60 Safety Relief Valve With Override
65 Rubber Hoses
71 Spring

DETAILED DESCRIPTION OF THE INVENTION

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not limitation.

Figure 1:
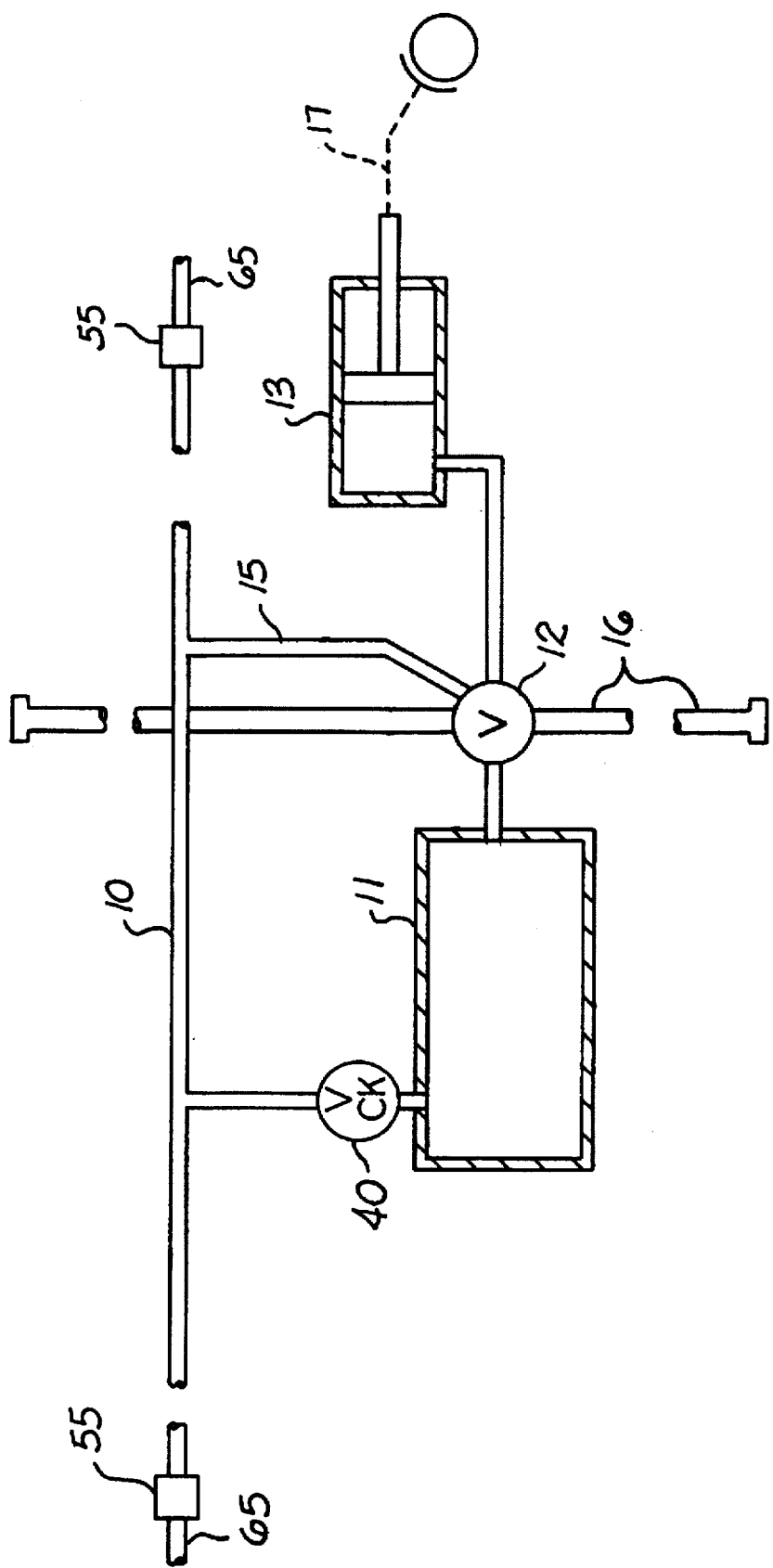
FIG. 1 is a simplified schematic diagram showing part of the conventional brake apparatus on a railroad car.

Referring first to FIG. 1, an air brake line 10 runs the entire length of the train and includes a rubber hose 65 connecting successive cars in the train. Each of these rubber hoses 65 has a quick release coupling 55 that facilitates the connection and disconnection of the air brake line 10 in one car to the air brake line 10 in the next car when the cars are mechanically coupled or uncoupled.

The air brake line 10 supplies pressurized air through a check valve 40 to a reservoir 11 on each car. The air reservoir 11 is connected through a pressure responsive valve 12 to a cylinder and piston unit 13, which operates a brake 14 on that car through a lever 23. See FIG. 3. Each car has several brakes, but only one is shown in FIG. 1 for the sake of simplicity.

The pressure responsive valve 12 senses the pressure in the air line 10 through its connection via a conduit 15. An operating rod 16 for manually operating the pressure responsive valve 12 is accessible at the bottom on one side of the rail car. operation.

Air pressure in the air brake line 10 is maintained at normal operating pressure Pn when the train is running. The pressure responsive valve 12 is fully closed in response to the operating pressure Pn in the air brake line 10 thus venting air pressure in the cylinder and piston unit 13, which releases the brake 14 and prevents it from being applied.

An engine or engines are uncoupled from the train at its destination and the brakeman or engineer relieves the pressure in the air brake line 10 which runs the entire length of the train. The pressure responsive valve 12 senses the pressure drop and opens to connect the air pressure in the reservoir 11 to the cylinder and piston unit 13, which applies the brake 14 to the car by means of a conventional mechanical coupling 17.

One or more workers then manually release the brakes by walking along the train, manipulating the operating rod 16 to manually operate the pressure responsive valve 12 on each car. The manual operation of the pressure responsive valve 12 releases pressure in the cylinder and piston unit 13 and the reservoir 11. The brakes on the car are thus released and the car may be uncoupled from others and moved. Much time is lost when a long train sits idle while this procedure is performed on each car.

The invention of the present application provides a novel brake release which is operated by the engineer or brakeman to release the brakes of the cars in the train at one time. The release may be executed when the train comes to a rest in the rail yard, or before the next engine is coupled to the train and ready to move.

Figure 2:
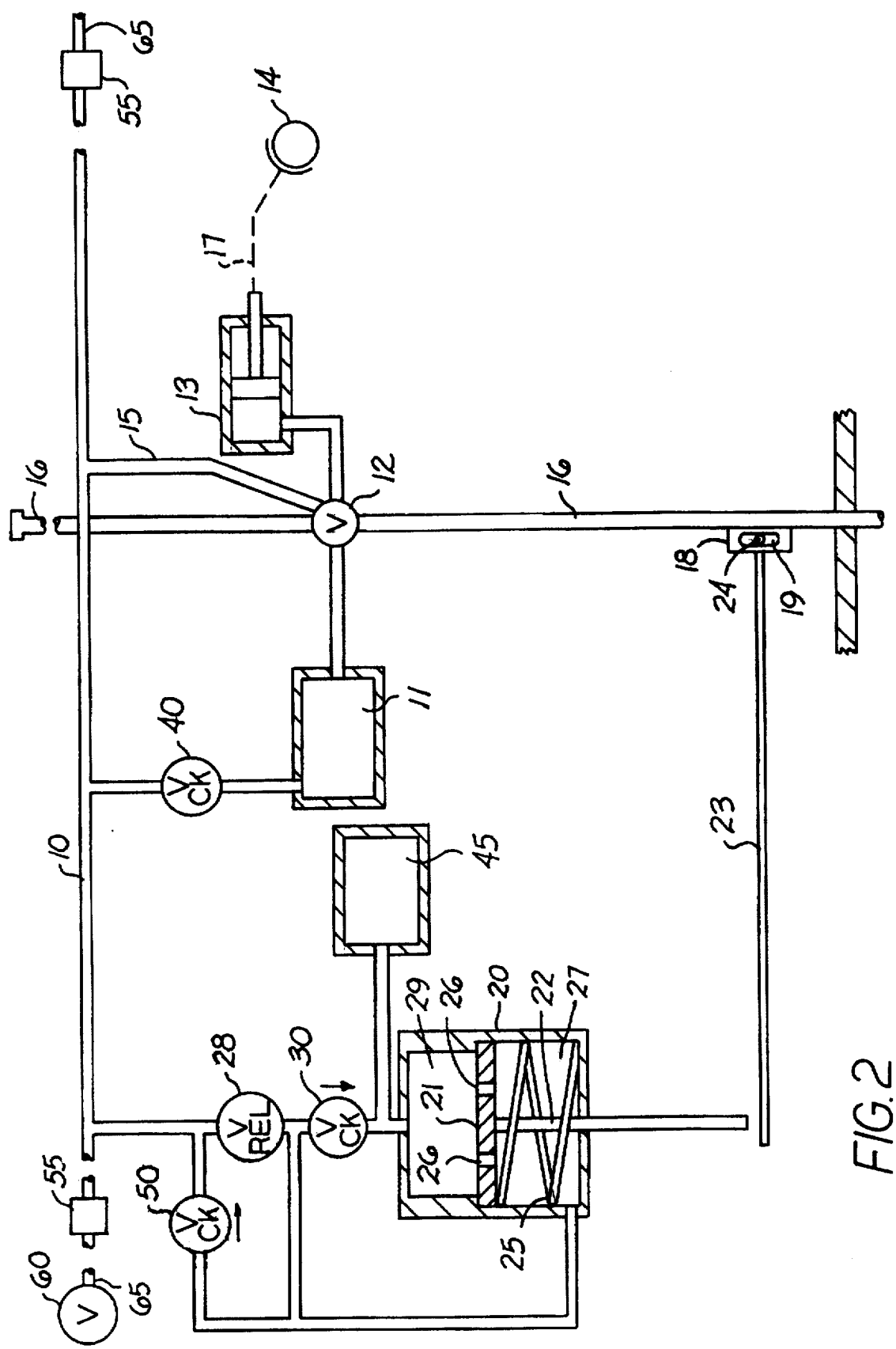
FIG. 2 is a simplified schematic diagram showing an illustrative embodiment of the brake release system of the present application added to the FIG. 1 apparatus. This embodiment implements the usual air brake line of the car to the system, though other arrangements are possible.
Figure 3:
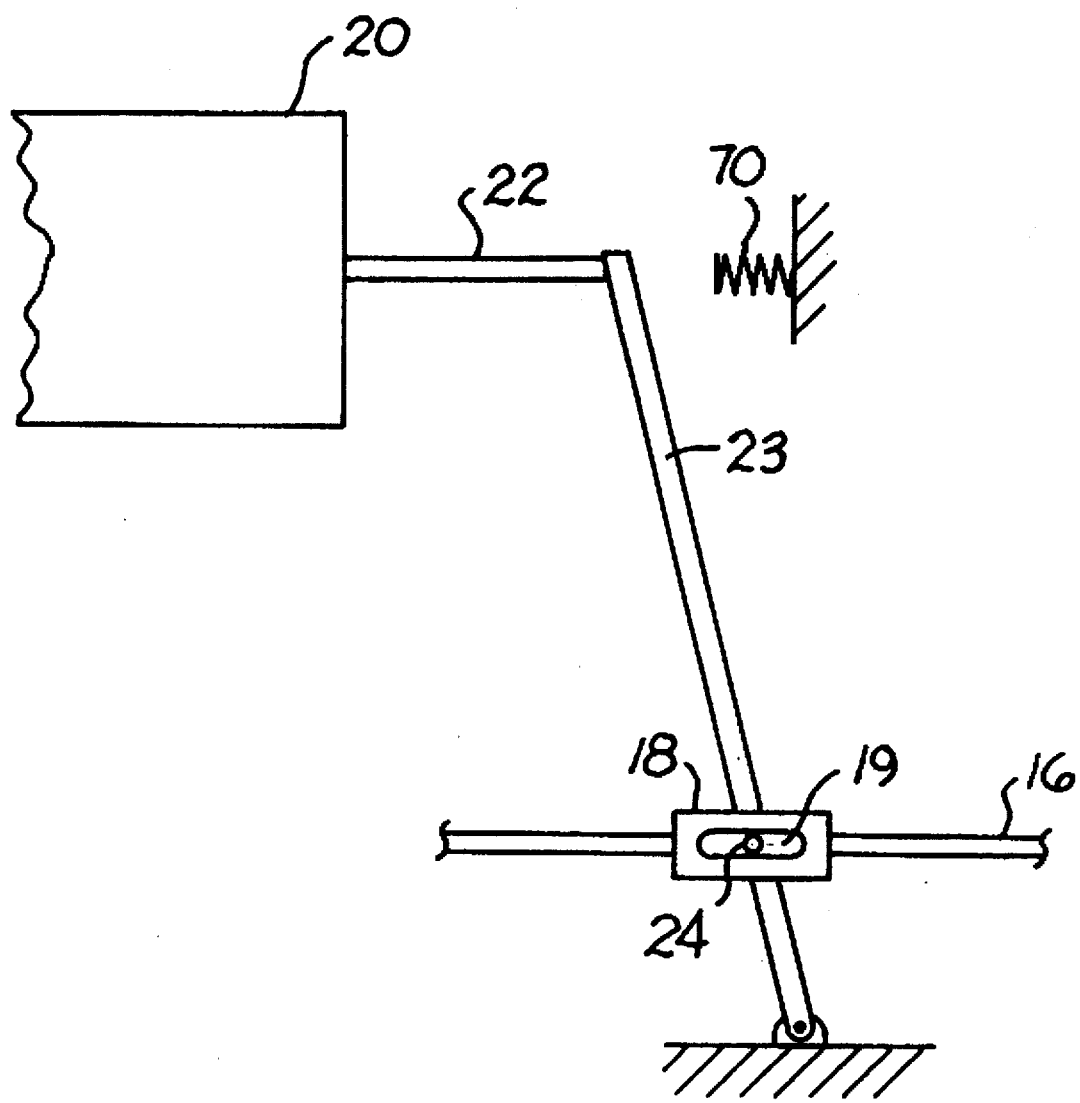
FIG. 3 illustrates a possible implementation of a mechanical connection of a piston rod to an operating rod for the embodiment of FIG. 2.

As shown in FIG. 2, the parts of the conventional brake apparatus of FIG. 1 are retained without change, except that the valve operating rod 16 is modified by the attachment of a plate 18 having a long slot 19 extending parallel to the rod; see FIGS. 2 and 3.

The brake release system of the present invention includes an air cylinder 20 having a piston 21 slideable therein. A piston rod 22 is connected through a linkage 23 to a follower 24 that is slideable along the slot 19 in the plate 18 which is attached to the operating rod 16. A spring 25 biases the piston 21 upward in FIG. 2. The piston 21 has one or more small bleed passages 26 therethrough for equalizing the air pressure on its opposite sides over time.

The air cylinder 20 includes a balancing chamber 27 on the lower side of the piston 21 and a compression chamber 29 on the upper side of the piston 21. The balancing chamber 27 is connected to one side of a check 50 valve which opens only to release pressure from the balancing chamber 27 into the air brake line 10 which is open to atmosphere when a car is uncoupled from the train. A valve 28 is connected to the air line 10. With normal air pressure Pn in the air brake line 10, the valve 28 is closed. However, if the pressure in the air brake line 10 is increased to a predetermined release pressure Pr the valve 28 opens and pressurizes the system. For example, release pressure Pr may be approximately 120% of Pn.

The cylinder compression chamber 29 on the upper side of the piston 21 and a sequencing reservoir 45 are connected to the outlet side of the valve 28 through a check valve 30, which opens to admit air into the cylinder compression chamber 29 and the sequencing reservoir 45 but blocks reverse flow from the compression chamber 29 and the sequencing reservoir 45. The balancing chamber 27 is connected directly to the outlet side of the valve 28.

A safety relief valve with override 60, is installed in the air brake line 10 before the air brake line 10 reaches the first car and prevents unintentional activation of the brake release by opening at pressure equal to or greater than the release pressure Pr. The safety relief valve with override 60 must be deliberately overridden so as to remain closed at pressures exceeding Pn thus allowing the brake release to function. The safety relief valve with override 60, replaces any other redundant relief valve aready in use which may impede the operation of the brake release system.

OPERATION

The brake release system of the present application is activated after bringing the train to a stop in the rail yard while an engine is coupled to the train. The engineer or brakeman activates the safety relief valve with override 60, and increases the air pressure in the air brake line 10. This pressure increase opens the valve 28 thus pressurizing the sequencing reservoir 45, the cylinder balancing chamber 27 and the cylinder compression chamber 29. The piston 21 is thus subjected to equal pressure on each side. The sequencing reservoir 45 fills before the cylinder compression chamber 29 fully pressurizes due to differing sized entrance air orifices of the cylinder compression chamber 29 and the sequencing reservoir 45. Pressurization of the sequencing reservoir 45 before the compression chamber 29 assures that the balancing chamber 27 pressurizes before the compression chamber 29 thus pressing the piston 21 to the top of the balancing chamber 27 and also assures adequate air volume to facilitate proper operation.

Next, the engineer uncouples the engine or engines from the train or otherwise releases the pressure in the air brake line 10 allowing pressure in the balancing chamber 27 to be released through the check valve 50. However, the check valve 30 traps air in the cylinder compression chamber 29 and the sequencing reservoir 45. Now, the resultant force of the pressure difference in the air cylinder 20 pushes the piston 21 downward compressing the spring 25. The kinetic energy of the stroke of the piston 21 is transmitted to the lever 23, the follower 24, and to the operating rod 16 moving it downward as shown in FIG. 2 so that it opens the pressure responsive valve 12 releasing the pressure in the reservoir 11 thus releasing the brake 14.

The brake release system of the present application now resets itself in a minute or less when air bleeds through the bleed passages 26 in the piston 21 thus venting the pressure in the cylinder compression chamber 29 after the brake 14 has been released. The spring 25 returns the piston 21 and the operating rod 16 to the "ready" position at the top of the balancing chamber 27. Now the pressure responsive valve 12 is closed and the cylinder and piston unit 13 and the reservoir 11 may be charged again.

The lost motion connection between the slot 19 in the plate 18 and the follower 24 that is actuated by the piston 21 enables the operating rod 16 to be operated manually if desired, without disturbing the piston 21, see FIG. 3. The air cylinder 20 and the piston 21 constitute a pressure responsive means for controlling the operation of the pressure responsive valve 12. The valve 28 and the check valves 30 and 50 respond to pressure changes in the air brake line 10 to charge the air cylinder 20. Thus relieving pressure in the air brake line 10 will actuate the air cylinder 20 and the piston 21 to operate the pressure responsive valve 12 thus releasing the brake 14 on a freight car. A spring 70 may be provided to receive and be compressed by the linkage 23 and then return the linkage 23 toward the piston rod 22 upon retraction of the piston rod 22.

We claim:

1. In a brake system on a railroad car having a brake air line whose equalizing pressure is controlled from the train engine and a brake release valve operatively connected between said air line and brakes on said railroad car to hold the brakes released in response to air pressure in said air line and to apply the brakes when the air pressure in said air line is relieved and pressure responsive means operatively connected to said brake release valve to control the latter's operation; and valve means operatively connected to said pressure responsive means and operable in response to a variance of pressurization of said air brake line followed by relief of the pressure in said air brake line to actuate said pressure responsive means to operate said brake release valve to release the brakes, the improvement which comprises:

cylinder and piston unit having cylinder chambers on opposite sides of the piston; and said valve means comprises an intake check valve communicating with the cylinder chamber on one side of the piston and operable to permit pressurized flow in to the cylinder and to prevent pressurized flow out of the cylinder, and a normally closed valve connected between the air line and both said check valve and the cylinder chamber on the opposite side of the piston, said normally closed valve being operable to open in response to above normal pressurization of the said air line, whereby to apply air pressure to the cylinder chambers on both sides of the piston, an exhaust check valve to relieve the air pressure in the cylinder chamber on said opposite side of the piston when the air line pressure is relieved while said intake check valve traps the air pressure in the cylinder chamber on said one side of the piston and a second said check valve releases pressure on the opposite side of said piston in response to a pressure drop in said air brake line whereby the pressure unbalance on the piston moves the piston in a direction to operate said brake release valve to release the brakes.

2. A brake system according to claim 1 wherein said piston has a bleed passage therein for slowly equalizing the air pressure in said compression chamber and balancing chamber following said movement of said piston, and further comprising spring means biasing said piston in the opposite direction from said movement.

3. A brake system according to claim 2, wherein: said pressure responsive means comprises a cylinder and piston unit having cylinder chambers on opposite sides of the piston; and said valve means comprises an intake check valve communicating with the cylinder chamber on one side of the piston having a cross sectional area smaller than said piston and operable to permit pressurized flow in to the cylinder and to prevent pressurized air flow out of the cylinder, and a normally closed valve connected between the air line and both said check valve and the cylinder chamber on the opposite side of the piston, said normally closed valve being operable to open in response to above normal pressurization of the said airline, whereby to apply air pressure to the cylinder chambers on both sides of the piston, said exhaust check valve to relieve the air pressure in the cylinder chamber on said opposite side of the piston when the air line pressure is relieved while said intake check valve traps the air pressure in the cylinder chamber on said one side of the piston whereby the pressure unbalance on the piston moves the piston in a direction to operate said brake release valve to release brakes.

4. A brake system according to claim 3 wherein said piston has means for slowly the air pressure in said cylinder chambers following said movement of said piston, and further comprising spring means biasing said piston in the opposite direction from said movement.

5. A brake system according to claim 4 wherein a mechanical coupling means includes a lost motion connection enabling said actuator to be operated manually to cause said brake release valve to release the brakes.

6. A brake system according to claim 1 having an air reservoir system being operable to assure an adequate quantity of air to sufficiently operate said cylinder and piston unit.

7. A brake system according to claim 6 comprised of air passages and/or compartments appropriately sized to control the sequencing of pressurization of said cylinder chambers as to allow operations of said piston.

\* \* \* \* \*